(12) United States Patent
Costea et al.

(10) Patent No.: US 8,756,598 B1
(45) Date of Patent: Jun. 17, 2014

(54) DISKLESS VIRTUAL MACHINE CLONING BY SEPARATELY CLONING A VIRTUAL DRIVE AND CONFIGURATION DATA OF A SOURCE VIRTUAL MACHINE FOR COMBINATION INTO A CLONED VIRTUAL MACHINE

(75) Inventors: George Costea, Durham, NC (US); Eric Forgette, Mechanicsville, VA (US)

(73) Assignee: NetApp, Inc., Sunnyvale, CA (US)

( * ) Notice: Subject to any disclaimer, the term of this patent is extended or adjusted under 35 U.S.C. 154(b) by 676 days.

(21) Appl. No.: 12/750,909

(22) Filed: Mar. 31, 2010

(51) Int. Cl.
*G06F 9/455* (2006.01)
*G06F 9/445* (2006.01)

(52) U.S. Cl.
USPC .............................................. 718/1; 717/174

(58) Field of Classification Search
None
See application file for complete search history.

(56) References Cited

U.S. PATENT DOCUMENTS

| | | | |
|---|---|---|---|
| 7,954,150 B2 * | 5/2011 | Croft et al. | 726/21 |
| 8,151,263 B1 * | 4/2012 | Venkitachalam et al. | 718/1 |
| 8,191,065 B2 * | 5/2012 | Frank | 718/1 |
| 2006/0179261 A1 * | 8/2006 | Rajan | 711/162 |
| 2008/0270564 A1 * | 10/2008 | Rangegowda et al. | 709/212 |
| 2009/0183152 A1 * | 7/2009 | Yang et al. | 718/1 |
| 2009/0260007 A1 * | 10/2009 | Beaty et al. | 718/1 |
| 2009/0282404 A1 * | 11/2009 | Khandekar et al. | 718/1 |
| 2010/0169881 A1 * | 7/2010 | Silvera et al. | 718/1 |
| 2010/0235828 A1 * | 9/2010 | Nishimura et al. | 717/174 |
| 2010/0257523 A1 * | 10/2010 | Frank | 718/1 |
| 2011/0185355 A1 * | 7/2011 | Chawla et al. | 718/1 |

* cited by examiner

*Primary Examiner* — Meng An
*Assistant Examiner* — Tammy Lee
(74) *Attorney, Agent, or Firm* — Cooper Legal Group, LLC

(57) ABSTRACT

One or more techniques and/or systems are disclosed that provide for cloning VMs, where different parts of the same VM are cloned separately. A temporary repository directory in a datastore of a storage controller is populated with a copy of one or more source virtual drive image files, which were generated from a source virtual machine (SVM) that is being cloned. A diskless virtual machine (DVM) is created in a destination container using configurations from the SVM. The copy of the one or more source virtual drive image files is cloned a desired number of times corresponding to a desired number of virtual machine clones. The DVM is cloned a desired number of times corresponding to a desired number of virtual machine clones. The DVM clones are combined with the source virtual drive image file clones in the destination container.

20 Claims, 11 Drawing Sheets

DISKLESS VIRTUAL MACHINE CLONING BY SEPARATELY CLONING A VIRTUAL DRIVE AND CONFIGURATION DATA OF A SOURCE VIRTUAL MACHINE FOR COMBINATION INTO A CLONED VIRTUAL MACHINE

FIELD

The instant disclosure pertains to distributed data storage systems, and more particularly to cloning virtual machines therein.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

When linking remote (or even locally dispersed) locations that require access to stored data, and/or to promote the continued availability of such data in the event of hardware, software, or even site failures (e.g., power outages, sabotage, natural disasters), entities have developed clustered networks that link disparate storage mediums to a plurality of clients, for example. Typically, to access data, one or more clients can connect to respective nodes of a clustered storage environment, where the nodes are linked by a cluster fabric that provides communication between the disparate nodes. Nodes can be dispersed locally, such as in a same geographical location, and/or dispersed over great distances, such as around the country.

A virtual server environment can comprise multiple physical controllers, such as servers, that access a distributed data storage and management system. Respective controllers may comprise a plurality of virtual machines (VMs) that reside and execute on the controller. The VM (a.k.a.: virtual server or virtual desktop) may comprise its own operating system and one or more applications that execute on the controller. As such, a VM can function as a self-contained desktop environment, for example, on the controller, emulated on a client attached to the controller, and multiple operating systems may execute simultaneously on the controller.

VMs on a controller can be configured to share hardware resources of the controller, and if connected to a distributed data storage and management system (cluster), share hardware resources of the cluster. A VM monitor module/engine (hypervisor) may be used to manage the VMs on respective controllers, and also virtualize hardware and/or software resources of the controllers in the cluster for use by the VMs. Clients can be connected to the cluster and used to interface/interact with a particular VM, and emulate a desktop environment, such as a virtual desktop environment, on the client machine. From the viewpoint of a client, the VM may comprise a virtual desktop, or server that appears as an actual desktop machine environment or physical server.

Multiple VMs executing may be logically separated and isolated within a cluster to avoid conflicts or interference between applications of the different VMs. In this way, for example, a security issue or application crash in one VM may not affect the other VMs on the same controller, or in the cluster. Further, a preferred version of a VM may be cloned and deployed throughout a cluster, and transferred between controllers in the virtual server environment.

Often, a preferred version of a VM (e.g., used as a baseline VM or gold image and/or template) is cloned a plurality of times and deployed, such as in a same controller or over a cluster, for access by attached clients. For example, virtual desktop infrastructures (VDIs) utilize cloned VMs to emulate desktop environments on clients, such as in secure working environments, and/or where retaining data for a cloned baseline VM may not be necessary. In this example, important information may be maintained on the controller or cluster, while transient data can be destroyed when the VM clone is destroyed or refreshed.

When cloning VMs, typically a storage container (e.g., virtual volume, datastore), which comprises the metadata and virtual drive information that makes up the VM, is cloned in its entirety. After the cloning, the VM clone is registered back to the hypervisor, and the files comprising the clone are manipulated in order to get an appropriate configuration to operate in the hypervisor environment without conflict (e.g., due to duplication of VM configurations).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A plurality of virtual machines (VMs) can be installed on one or more physical machines, for example, to maintain different operating systems for running beta tests on programming, to operate separate workstations, and/or to maintain separate servers on a limited physical system, etc. As an example, an enterprise system that maintains a networked storage system may operate a plurality of VMs for use by users of the system. In this example, groups of VMs may be consolidated on servers running a hypervisor environment. Further, data management and storage servers may be consolidated as virtual servers on physical servers in the enterprise storage system, for example, so that individual virtual servers are relatively isolated from each other.

In this example, in certain situations an enterprise may wish to add VMs to the enterprise system, but operating needs and storage needs of the individual groups or functions may not require an entire server. In these situations, cloning VMs and even cloning a storage container that holds the VMs on a storage volume (e.g., a storage server) in the enterprise storage system may be appropriate. Present solutions to VM cloning, for example, include copying of files associated to the VM to another location in the storage container, thereby creating a clone of a base VM.

In this example, the copy of VM files can duplicate (redundant) data on a same storage container for a clone of the base VM. Further, copying of files associated to a base VM can be cumbersome, requiring time during which computer resources can be tied up and thus unavailable for other uses. Additionally, cloning a storage container (e.g., within a storage volume) comprising duplicate copies of VM files can create multiple duplicate copies of VM files on a same storage volume, that may propagate communications errors with the VMs due to duplicate settings.

Accordingly, as provided herein, one or more techniques and/or systems provide for cloning virtual machines, such as on a controller or a cluster of connected controllers, instead of cloning the storage container (that comprises the VM) in its entirety. As will be appreciated, this provides an efficient technique for offloading the duplication of virtual drives and datastores to a storage controller when cloning virtual machines, which can drastically reduce the amount of time, resources and capacity required to create clones of virtual machines. To achieve the same, a baseline VM can be cloned a plurality of times in a storage container (e.g., virtual volume or datastore) of a storage controller. Further, the cloning of the storage components of the VM can be separated from the cloning of the other VM components (e.g., metadata associated with processor and memory configurations), and offloaded to a storage controller for fast and efficient cloning.

In one embodiment of cloning VMs, a temporary repository directory in a datastore of a storage controller is populated with a copy of one or more source virtual drive image files, which were generated from a source virtual machine (SVM) that is being cloned. Either relatively concurrently (e.g., occurring at or about the same time) or relatively sequentially (e.g., occurring substantially one after the other) with the populating of the repository, a diskless virtual machine (DVM) is created in a destination container using configurations from the SVM (e.g., the VM configuration metadata). The copy of the source virtual drive image file is cloned a number of times so as to meet a desired number (e.g., a number chosen by a user or needed for the task at hand, such as for deploying to an enterprise comprising a minimum number of users) of virtual machine clones. The DVM is also cloned enough times to meet a desired number of virtual machine clones. The DVM clones are then combined with the source virtual drive image file clones in the destination container, thereby creating clones of the SVM.

It will be appreciated that offloading these cloning actions to a storage controller can free up resources that would otherwise be consumed if a storage container was cloned in its entirety (e.g., where additional (redundant) data may likewise be (unnecessarily) cloned as well). Also, because cloning the source virtual drive image files and cloning the diskless virtual machines (DVMs) may occur at different rates and/or require different resources, etc., performing these operations separately allows these different operations to be performed in respective manners that can be tuned to achieve more desirable results (e.g., so that completion of the cloning of a source virtual drive image file occurs at the same time as completion of the cloning of a DVM). Further, while image files or similar terms are used herein, these terms are not to be interpreted in a limiting manner, but are instead to have a broad meaning. That is, the claimed subject matter is not meant to be limited to a file structure being cloned, copied, reproduced, etc. Rather, any suitable (data containing) structure that can contain source virtual drive image data, for example, can be cloned as provided herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
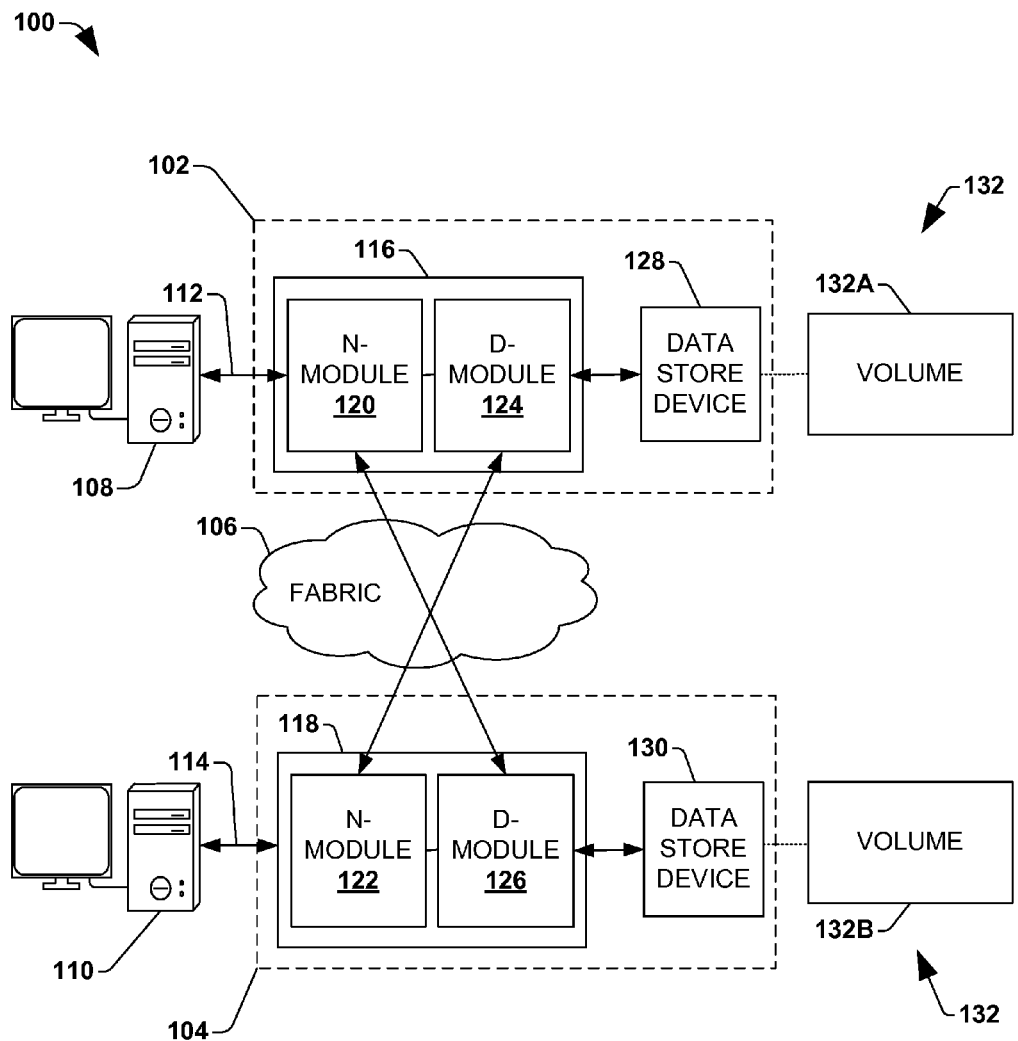
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a multi-node, clustered data storage and management network (cluster), data can be stored in a plurality of nodes and distributed clients can be connected to the cluster via one of the plurality of nodes (e.g., comprising storage controllers). One or more virtual machines (VMs) can be instantiated on a controller or throughout the cluster. Further, a preferred version of a VM can be cloned a plurality of times, and the plurality of the VM clones can be deployed on the controller or throughout the cluster.

Figure 2:
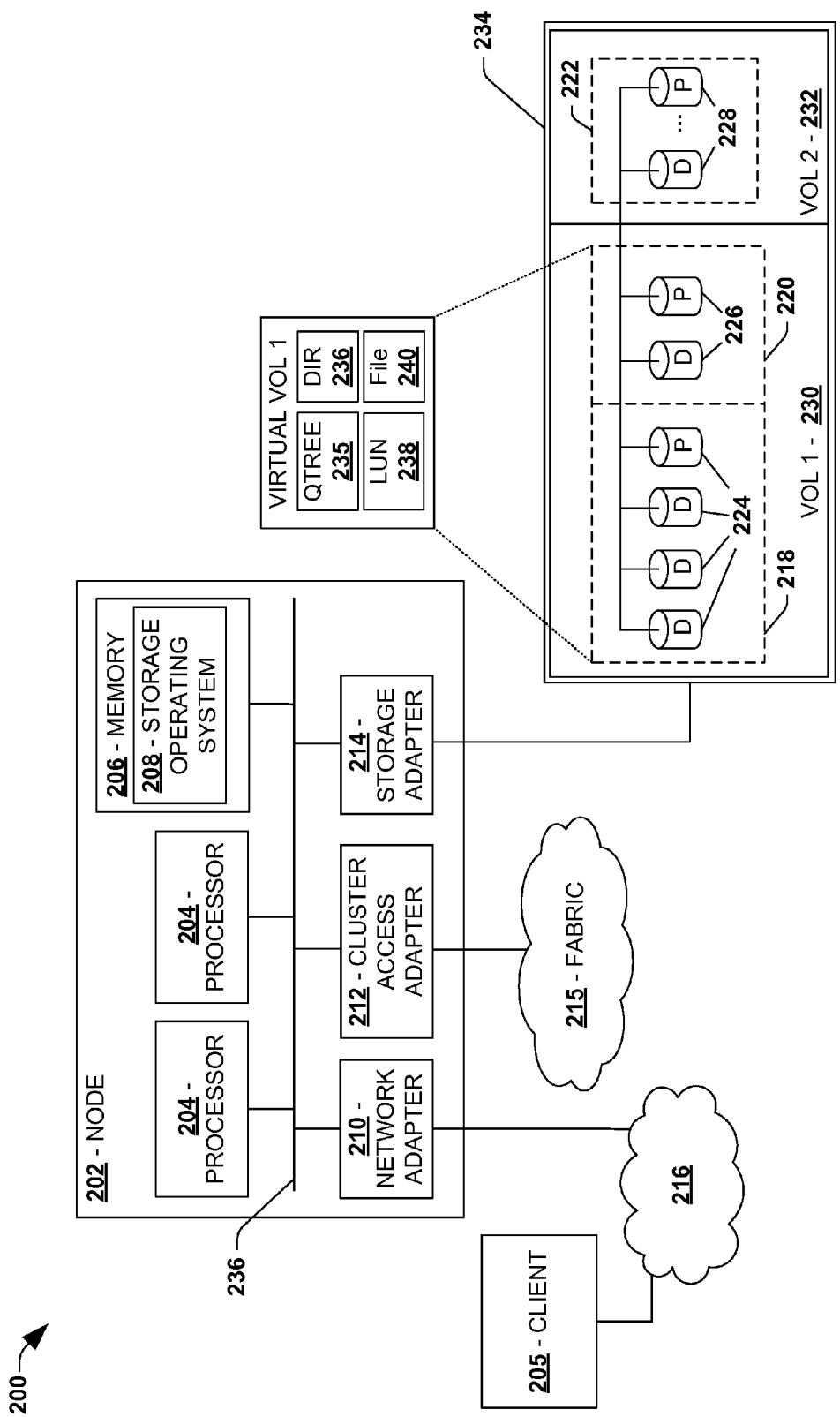
FIG. 2 is a component block diagram illustrating an example data storage system in accordance with one or more of the provisions set forth herein.

To provide a context for an embodiment of cloning VMs by separating a cloning of storage components of the VM from cloning of the other portions of the VM, FIG. 1 illustrates a clustered network environment 100, for example, where one or more datastores comprising a source VM and locations for storing VM clones may be disposed, such as in the volumes 132A-B, and FIG. 2 illustrates an embodiment of a data storage system that may be implemented to store and manage data in this clustered network environment, and perform portions of the VM cloning, and/or comprise components of a VM cloning system. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays as a filesystem for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

As an illustrative example, a virtual machine (VM) may comprise a framework of an operating system, applications and system configurations that can be stored in a distributed data storage system (e.g., 100 of FIG. 1). In this example, the VM can utilize hardware components of a client (e.g., 108, 110 of FIG. 1), or controller (e.g., 102, 104 of FIG. 1), such as a processor and local memory, to emulate a computing device, such as a desktop environment or a physical server. That is, a personal computer (PC) and/or physical server typically comprises their own operating systems, applications and system configurations to enable a user to operate the device.

In this example, the virtual machine can emulate a desktop environment or server on the PC using the PC's hardware (or the controller's hardware), but utilizing the operating system, applications and system configurations stored for the VM in the distributed data storage system. Further, a plurality of VM can be cloned from a source VM (e.g., preferred version of a VM), and the configurations for the VM clones can also be stored in the distributed data storage system. In this way, a plurality of clients can run the VM clone by accessing the stored configurations through the distributed data storage system.

Further, a cluster of virtual servers may be linked to a storage volume (e.g., 230, 232 of FIG. 2) that can be used to back up data from the plurality of virtual servers. Further, VMs may be used to separate storage on a computer system, such as a cluster, in order to create isolated storage systems. VMs operate in a hypervisor environment, whereby a hypervisor interacts with physical devices, such as processors, input/output devices, memory and storage, and the hypervisor emulates a capability of these devices to the VMs.

In one embodiment, as illustrated by the example environment 100 of FIG. 1, a storage controller (e.g., 102) can comprise a datastore (e.g., stored on volume 132), for storing cloned portions of a VM from a source VM. Further, other components of a system for cloning a VM may be disposed on the controller, and/or in combination with a second controller (e.g., 104) in a cluster. Components for such a system may be disposed in a node (e.g., 116, 118) of the controller, and/or disposed in a network module (e.g., 120, 122) or a data-module (e.g., 124, 126).

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to clone VMs by separating cloning of the VM's virtual drives from cloning of the remaining portions of the VM.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual hard drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 224, 226 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 224 by using one or more addresses that identify the LUNs 238.

Figure 3:
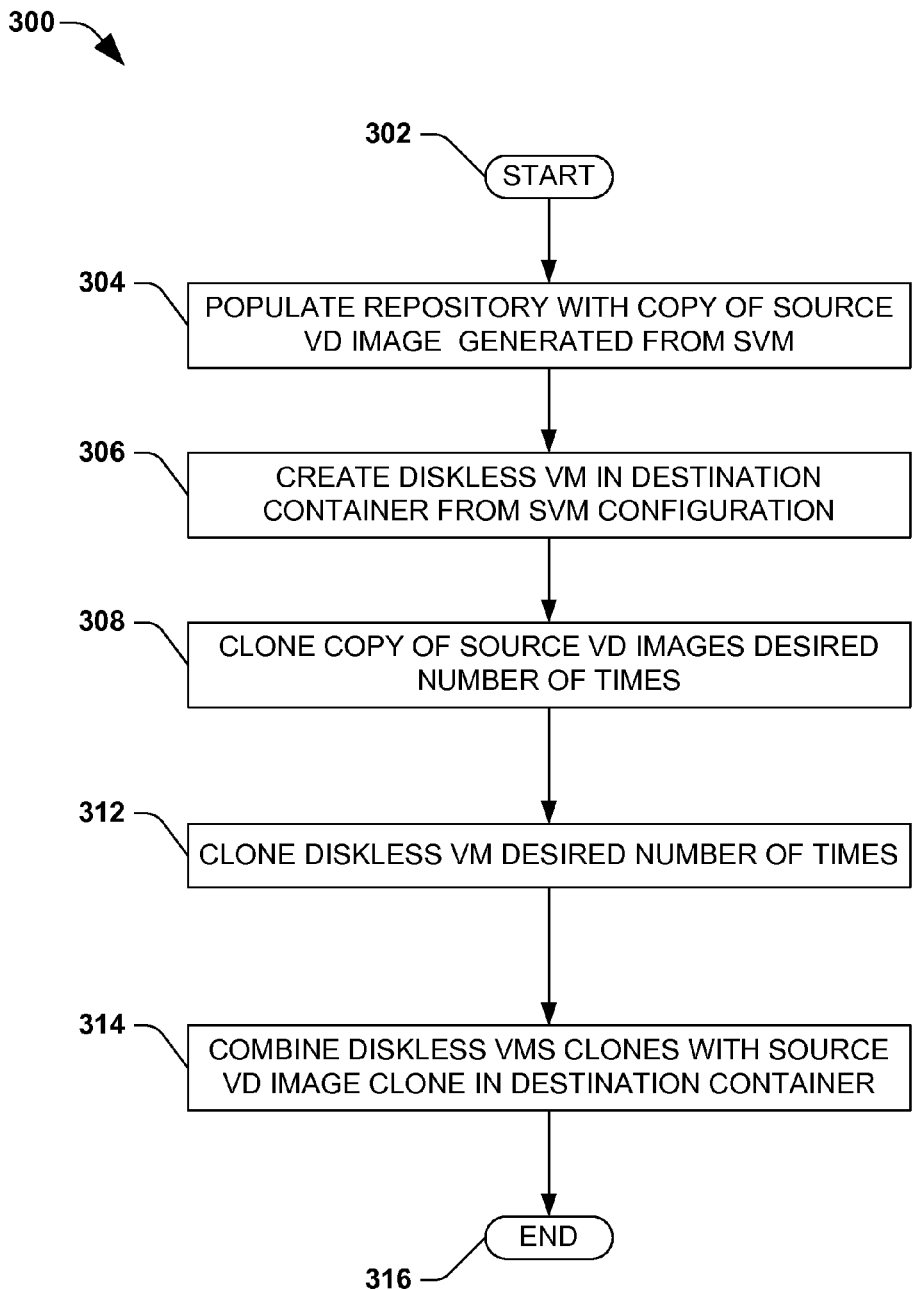
FIG. 3 is a flow chart diagram illustrating an example method for cloning virtual machines by separating cloning of virtual drives from the virtual machine cloning in accordance with one or more of the provisions set forth herein.

A method can be devised that provides for efficient cloning of a VM. FIG. 3 is a flow diagram of an example method 300 for cloning virtual machines by separating cloning of virtual drives from the virtual machine cloning. It will be appreciated that this allows one or more operations to be offloaded to a storage controller, for example, to more efficiently utilize resources, and also allows different cloning operations (e.g., cloning of virtual machines vs. cloning of virtual drives) to be performed in respective manners to achieve more desirable results. For example, cloning virtual drives may require substantial amounts of data to be reproduced and/or operations to be performed such that offloading these resource intensive operations to a storage controller allows other resources of a storage system not to be consumed by these operations, but to instead be handled by the controller so that overall operation of the storage system is not slowed down or otherwise overburdened. Similarly, because cloning virtual machines and cloning virtual drives may occur at different rates and/or require different resources, etc., performing these operations substantially independently of one another allows these different operations to be performed in respective manners that can be tuned to achieve more desirable results (e.g., so that both cloning operations are completed at substantially the same time).

The example method 300 begins at 302 and involves populating a temporary repository directory in a datastore of a storage controller with a copy of one or more source virtual drive image files, at 304. In this embodiment, the source virtual drive image files are generated from a source virtual machine (SVM) that is being cloned.

For example, with reference to FIGS. 1 and 2, a distributed data storage and management system (cluster) can comprise a plurality of data storage volumes (e.g., 132 of FIG. 1, 230, 232 of FIG. 2), as described above, which may comprise data distributed over a plurality of data storage devices (e.g., 128, 130 of FIG. 1, 234 of FIG. 2), respectively comprising a plurality of data storage components, such as disks (e.g., 224, 226, 228 of FIG. 2), found in structured arrays (e.g., 218, 220, 222 of FIG. 2) in the storage device.

In one embodiment, a datastore can be a type of database that organizes data in a desired structure (e.g., one that meets applicable needs) to enable access (e.g., read/write) according to its particular use. Datastores can be comprised of a directory structure (e.g., a directory, such as 236 of FIG. 2, or a Qtree, such as 235 of FIG. 2) and data (e.g., LUNs, such as 238 of FIG. 2, and/or files, such as 240 of FIG. 2) that are stored in a volume in the cluster. In one embodiment, the repository is disposed in a datastore (or volume), which is, for example, merely a data storage container on a storage controller, which can comprise a virtual volume (e.g., 132 of FIG. 1, 230, 232 of FIG. 2), or may comprise a datastore disposed on a virtual volume, as described above.

Further, the destination datastore (or volume) may be (pre) existing, for example, or one that is created for storing (and cloning) the VM's virtual drives separately from the other parts of the VM. In one embodiment, a datastore can be created with a temporary directory configured to store the virtual drive image files. In another embodiment, where the destination datastore already exists on the storage controller, for example, the temporary directory can be created in a root of the datastore directory.

In one embodiment, the temporary directory is a repository for temporarily storing information that comprises components of the SVM, such as the virtual drives, to be cloned. For example, the SVM comprises virtual drives, as described above, which can be comprised of storage locations distributed over the distributed data storage system and organized on virtual volumes. In one embodiment, the temporary directory (repository) can be used to store information (e.g., a pointer) that identifies a location of a source virtual drive image files that was generated from the SVM's virtual drive (or a plurality of image files of a plurality of virtual drives for the SVM).

At 306 in the example method 300, a diskless virtual machine (DVM) is created in a destination container using configurations that are identified from the SVM. In one embodiment, a DVM is a virtual machine without information that comprises virtual disks or virtual disk controllers (e.g., SCSI adapters), for example. As described above, a VM is comprised of various components that allow it to emulate a physical machine (e.g., desktop PC, server, etc.), such as on a client attached to a cluster (e.g., 108, 110 of 100 in FIG. 1), including virtual storage drives/disks, and virtual storage disk/drive controllers.

In this embodiment, a new VM is created from the SVM, in a destination container, where the destination container comprises a host for the one or more VM clones that are being generated. For example, the host is a hypervisor (or a group of hypervisors) selected to run the VM clones to be created. As described above, VMs operate in a hypervisor environment, where the hypervisor(s) interacts with physical devices, and emulates the capability of these devices to the VMs. Here, the host of the newly created DVM is the destination container comprising the hypervisor(s) environment.

Additionally, in this embodiment, the DVM is created from the information that makes up the SVM. That is, for example, the DVM is not a clone of the SVM, but the information (e.g., configurations of CPU, memory, user specified options, and other settings) is used to create a new version of the SVM (a diskless version), which has the same configurations, but also has unique characteristics, such as a network interface for the DVM having a unique MAC address. In this way, in this example, potential networking conflicts (e.g., caused by more than one VM having a same MAC address) can be mitigated when the VMs are running on a controller or in a cluster.

In one embodiment, a processor disposed in a controller (102, 104 of FIG. 1), such as comprising a node (e.g., 116, 118 of FIG. 1) in a cluster, may be utilized to create the DVM from an SVM stored in an attached storage device (e.g., 128, 130 of FIG. 1). That is, for example, the appropriate SVM configuration information can be retrieved from the storage attached to the controller, and the drive/disk information can be retained in the storage or stored temporarily in memory (e.g., 206 of FIG. 2) for populating the repository, as described above. In this example, components of the controller can create a new DVM from the retrieved SVM information, and it can be stored in a container on a volume (e.g., 230, 232 of FIG. 2) of the attached storage.

At 308 of the example method 300, the copy of the one or more source virtual drive image files, resident in the temporary repository, are cloned a desired number of times, where the desired number of times corresponds to a desired number of virtual machine clones that are created from the SVM (e.g., a desired number may comprise a number needed for a task at hand, such as creating VMs to be deployed to an enterprise for a number of users). For example, the SVM may comprise one or more virtual drives, and a copy of each of the virtual drives were populated to the temporary repository, as described above, resulting in a set of one or more virtual drives from the SVM. Here, the set of virtual drive image files from the SVM is cloned a desired number of times.

As an example, if the result of the VM cloning provides for six clones of the SVM (e.g., a user/administrator or some program chooses to create six clone of the VM), the set of image files can be cloned five times (e.g., desired number is five times), resulting in six copies of the set of source virtual drive image files (e.g., five plus the first one=six). Further, as an example, if the result of the VM cloning is merely one clone of the VM, the desired number of times for the cloning of the source drives is zero, as the first set of source virtual drive image files can be used for the clone.

Cloning of the image files is not limited to any particular embodiment. In one embodiment, a fast and efficient cloning of the image files can be performed using a data-container (e.g., file) level cloning mechanism. As an example, a file-level clone can be created by creating an empty image file that has a pointer to a location in storage (e.g., on a volume in a controller or cluster) where the image file that is be cloned is stored. In this example, the clone is quickly created and takes up very little storage. However, other cloning or copying techniques may be used, such as native cloning mechanisms (e.g., native to the hypervisor and/or to the controller) or traditional file copy techniques. For example, a native cloning mechanism can be one that is written (e.g., the code for running the mechanism) specifically for a particular hypervisor or controller.

At 312 in the example method 300, the DVM is cloned a desired number of times, where the desired number of times corresponds to the desired number of virtual machine clones, such as described above. That is, for example, if a result of the VM clone creation yields six clones, the DVM (the baseline DVM created from the SVM) is clone five times to yield a total of six DVMs (the baseline DVM plus the five DVM clones=six total). In one embodiment, the baseline DVM, residing in the destination container (e.g., hypervisor environment), can be cloned using a native cloning mechanism, such as one that is native to the hypervisor(s) environment. The DVM cloning is not limited to any particular embodiment, and can be done using any commonly used VM cloning techniques, or VM cloning techniques that may be devised by those skilled in the art.

At 314, the DVM clones (including the baseline DVM) are combined with the source virtual drive image file clones in the destination container. In one embodiment, in order to combine the DVMs and virtual drives for the clone of the SVM, the virtual drive is taken out of the temporary directory (repository) in the datastore of the storage controller and moved to a directory of the DVM in the host. That is, for example, the repository can be a directory comprising pointers to the storage location of the virtual drives. In this example, the pointers can be moved into the directory of a DVM in the host environment. Further, each set of virtual drive image file clones that represents a set of virtual drives from the SVM is moved to the directories of the respective DVM clones. In this way, in this example, each DVM clone, including the baseline DVM, will be combined with a set of virtual drives from the SVM.

Having combined the DVMs with the virtual drives, and thereby created clones of the source VM, the example method 300 ends at 316.

Figure 4:
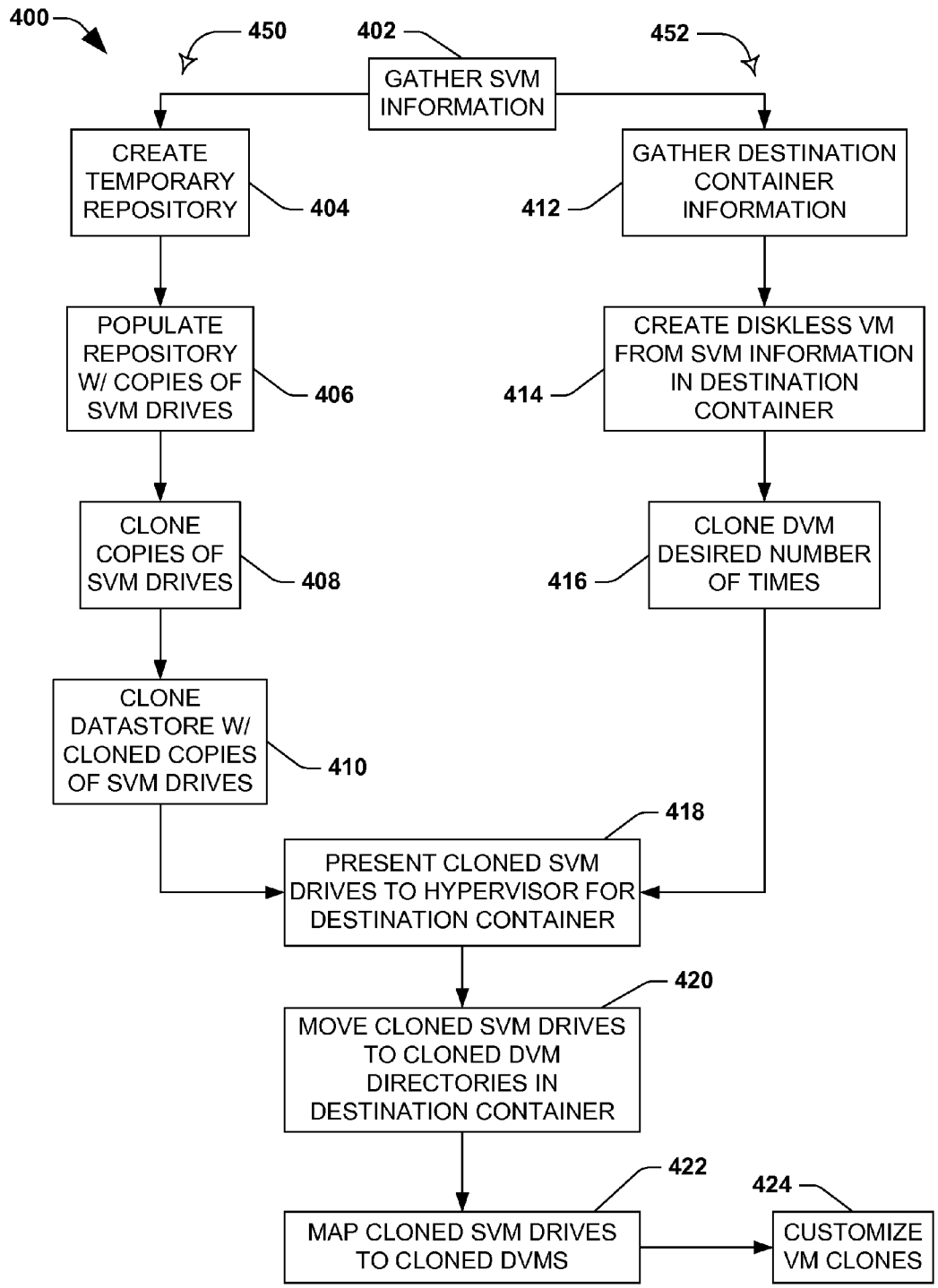
FIG. 4 is a flow diagram illustrating an example embodiment implementing techniques for cloning virtual machines in accordance with one or more of the provisions set forth herein.
Figure 5:
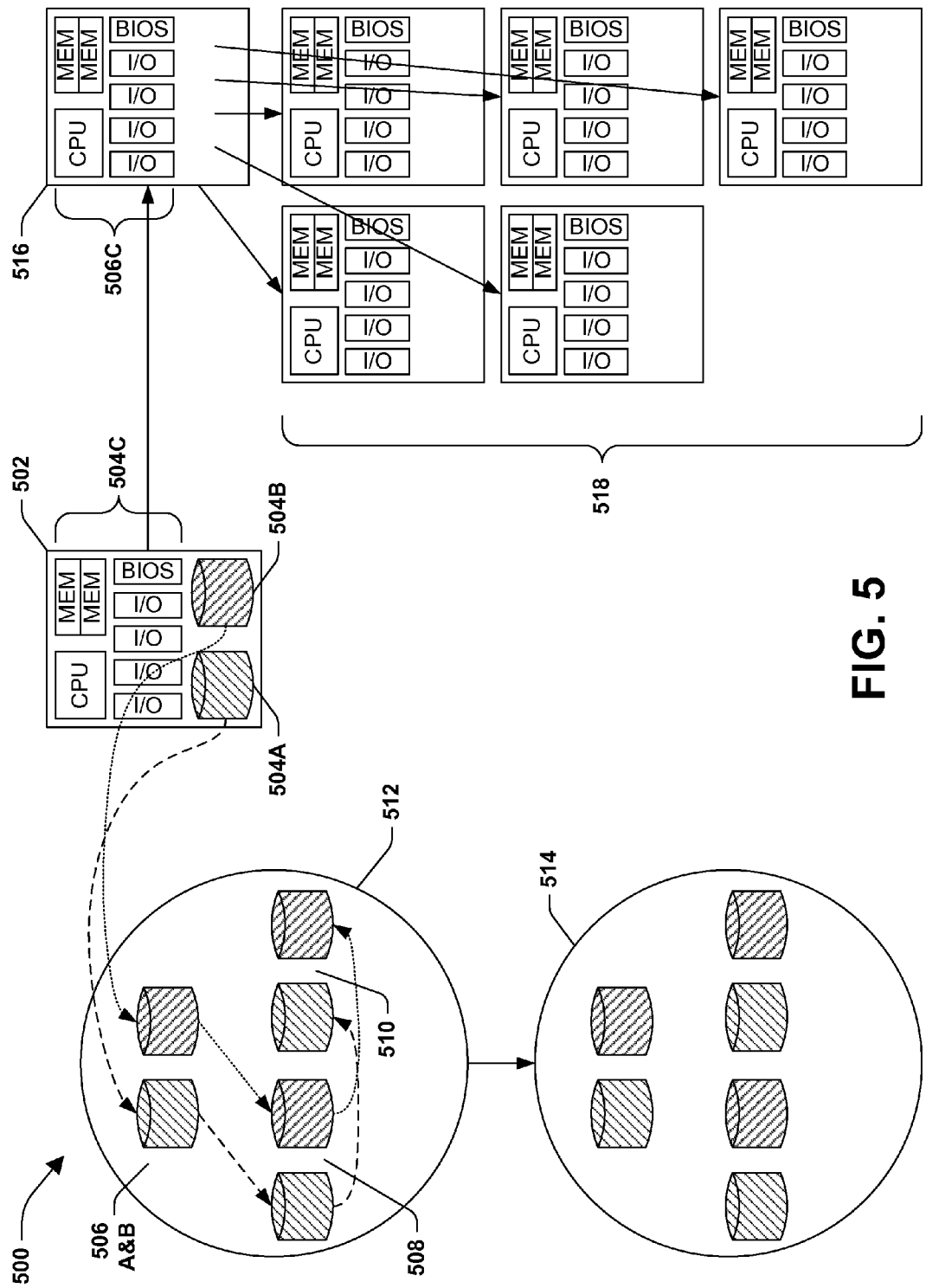
FIGS. 5-7 are component diagrams illustrating example embodiments in accordance with one or more of the provisions set forth herein.
Figure 6:
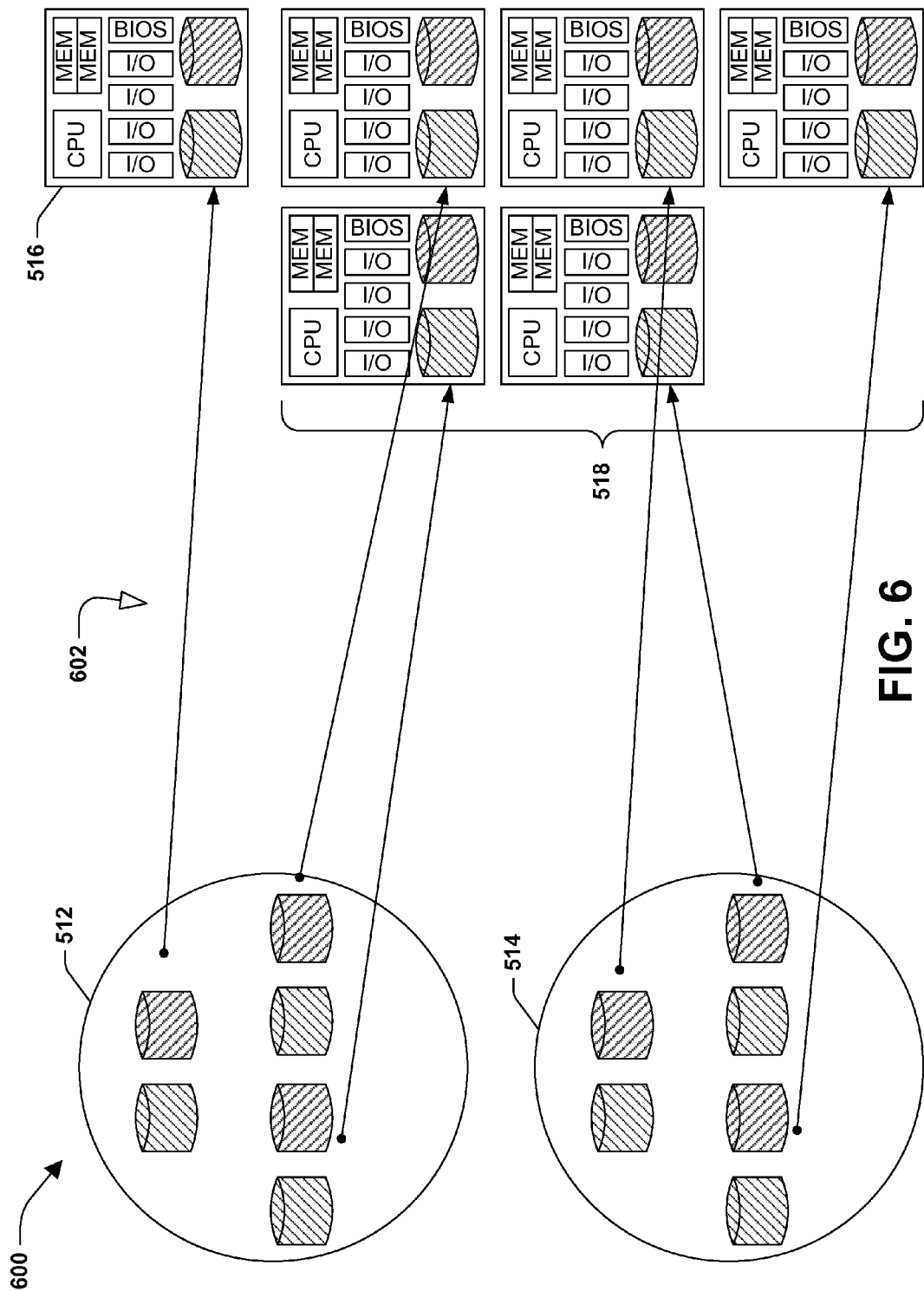

FIG. 4 is a flow diagram illustrating one embodiment implementing one or more techniques for cloning a VM in accordance with one or more of the provisions set forth herein, with reference to FIGS. 5 and 6 for illustrative purposes. At 402, information is gathered from the source virtual machine (SVM). In one embodiment, the SVM can be interrogated (e.g., information and/or data gathered there-from) to determine configurations for creating the diskless virtual machine (DVM). The SVM may be a VM, a VM template, a snapshot of a VM, or some other embodiment that provides for determining a configuration.

As described above, a VM can include, but is not limited to, a processor configuration (e.g., number and type of CPUs), memory configuration, some user specified options, a unique identifier for the VM, and other configurations that are emulated by a hypervisor environment to act a physical machine. In this embodiment, a VM that is in use by a controller can be used as the SVM (e.g., the VM can be interrogated to determine the configurations). Further, a VM template can be used, where a VM template is a non-operational VM, such that it has all the appropriate configurations but is not powered on (e.g., just used as a template for cloning). Additionally, a snapshot can be used, where a snapshot is a saved configuration of a VM at a particular time (e.g., snapshot in time of a preferred embodiment), which are often taken when the VM is running in a preferred manner (e.g., optimally in accordance with its desired uses).

As an example, with reference to the system 500 of FIG. 5, the SVM 502 comprises virtual storage 504A&B (e.g., virtual drives, disks, adapters) and operational configurations 504C (e.g., processor, memory, bios, adapters), which can be determined by interrogating the SVM 502. Interrogating the SVM, for example, can merely be collecting information about the SVM by reviewing the stored data that comprises the SVM, such as by using a VM cloning utility, however, the interrogation is not limited to any particular embodiment.

The example embodiment 400 diverges into two paths 450 and 452, as described above, where the virtual storage components (e.g., 504A&B) are cloned 450 and the other components (e.g., 504C) of the SVM are cloned 452 separately. It will be appreciated the two paths described and illustrated by 450 and 452 can be performed concurrently, or consecutively, and if performed consecutively, are not limited to a particular order. For example, in one embodiment, path 450 may be performed on a storage controller while path 452 is performed on a separate controller that comprises the VM(s).

At 404, in path 450, a temporary repository 512 is created in a storage controller (e.g., a controller, such as node 202 in FIG. 2, which comprises storage components, such as comprised in the storage device 234 of FIG. 2). As described above, a temporary repository can be a directory in a datastore, comprised on a virtual volume of the storage controller. The repository 512 is populated with copies or clones of the SVM storage components 506A&B (e.g., virtual drives). That is, for example, a source virtual drive image file (e.g., 506A, 506B) can be copied from a volume comprising the SVM to the repository directory 512.

In one embodiment, an image is taken (e.g., a snapshot) of the SVM virtual drive, and the file of that image is copied to the repository using a native file copying mechanism. In another embodiment, the image file can be cloned, using a VM cloning mechanism, to the repository. Using the copying or cloning may depend on where the storage controller is located with respect to the volume that comprises the SVM. For example, a virtual cloning mechanism (e.g., commonly available cloning tools) may be used when the storage controller is a different controller than the one on which the SVM is stored. As another example, if the temporary repository is in a different volume than the SVM (and optionally on a same controller), a network data management protocol copy mechanism may be used. Also, in this example, the network data management protocol copy mechanism may be used when the temporary repository and SVM are on different controllers. As another example, if the repository and SVM are in the same volume, a data-container level cloning mechanism may be used.

It is to be appreciated that the populating of the repository is not limited to any particular embodiment, and it is contemplated that those skilled in the art may devise alternate techniques for populating the repository. For example, a file-level cloning technique may be utilized to populate the repository even if it is located on a different controller than the SVM, or some other copy/cloning technique may be devised for this purpose.

At 408 in the example embodiment 400, the copies/clones of the SVM image files 506A&B are cloned in the repository. As illustrated in FIG. 5, the SVM image file clones/copies 506A&B are clone twice, 508 and 510, so that the volume comprising the repository 512 comprises three sets of clones/copies of the SVM virtual drives, as image files, for example.

At 410, the datastore or volume that comprises the repository (e.g., 512) can be cloned, to create a clone/copy of the datastore or volume comprising clones/copies of the source virtual drive image files. As illustrated in FIG. 5, the datastore or volume comprising the repository 512 is cloned to create a second copy of the datastore or volume 514, which has clones/copies of the SVM drives. In this example, the storage controller now comprises six sets of SVM virtual drive image files after the datastore or volume cloning operation. Further, if desired, the volume or datastore can be cloned a plurality of times, which provides for a sort of cloning/copying multiplier by creating a plurality of copies/clones of the image files without having to clone each one respectively.

In one embodiment, the source virtual drive image files (e.g., 506A, 506B) can be cloned using a data-container level cloning mechanism, for example, which can provide for fast and efficient cloning of the files. Further, in one embodiment, the datastore or volume comprising the repository (e.g., 512) can be cloned using a volume-level cloning mechanism, for example, which can provide for fast and efficient cloning of a volume. However, the cloning of the files, volume or datastore can be performed using other techniques, such as native cloning or file copying.

In one embodiment, the storage controller can perform the cloning of the source virtual drive image files, and/or the volume or datastore, thereby separating this task from the cloning of the DVM. In this way, for example, improvements can be made in the speed and efficiency for the cloning of the SVM, particularly when the paths 450 and 452 are performed in parallel.

At 412 in path 452 of the example embodiment 400, Information is gathered about the destination container for the DVM clones of the SVM. As described above, a destination container for the DVM clones, for example, comprises a hypervisor environment. In this embodiment, the host that is associated with the destination container can be identified.

That is, for example, the destination container can be a hypervisor (host), group of hypervisors (host cluster), or all hypervisors know in a management hierarchy (datacenter). In another embodiment, the destination container may be a logical grouping, such as a resource group or virtual application (resource group) on a host or host cluster.

Further, in this embodiment, the respective hosts associated with a chosen container (e.g., chosen by a user/administrator or programmatically for cloning the DVM(s)), is checked to verify that it is able to communicate with the datastore that comprises the repository directory (e.g., comprising the cloned virtual drives). As an example, the checking can be performed programmatically (e.g., automatically) or manually (e.g., by a user operating a user interface) using the controller (e.g., or components therein) on which the destination container is disposed.

At 414, using the SVM information, such as gathered at 402 above (e.g., 504C from SVM 502 of FIG. 5), the DVM is created in the destination container. As described above, the DVM (e.g., 516) is diskless, which means that the data storage adapters and/or virtual hard drives of the SVM are not created in the DVM. Instead, for example, merely the non-storage related components of the SVM (e.g. 504C) are created for the DVM (e.g., 506C or 516). It will be appreciated that the creation of the DVM from the SVM is not limited to any particular embodiment. That is, for example, a VM creation application may be utilized, compatible with the operating systems and/or components of the controller, to create the DVM in the destination controller.

At 416, the DVM is cloned a desired number of times, for example, so that the total number of DVMs is equivalent to a desired number of SVM clones (e.g., desired by a user/administrator for use in a system). As an example, with reference to FIG. 5, the DVM created in the destination container 516, is cloned using a VM cloning mechanism, thereby creating five clones of the DVM 518 for a total of six DVMs (the original DVM 516 plus the cloned DVMs 518). It will be appreciated that the DVM cloning is not limited to any particular embodiment. For example, a native cloning mechanism may be used, a data-container (e.g., file or block of data) level cloning of an image of the DVM may be performed, or some other efficient cloning technique.

At 418 in the example embodiment 400, the cloned source virtual drives (e.g., virtual storage image files from the SVM), such as those found in the datastores 512 and 514 of FIGS. 5 and 6, are presented to the host(s) (e.g., one or more hypervisors) of the destination container comprising the DVMs. In one embodiment, in order to combine the cloned SVM drives with the cloned DVMs, the datastores comprising the virtual drives are presented to the hypervisor(s) of the destination container (e.g., datastore storage location information is sent to hypervisor). As an example, the host receives the datastore information and can prepare to host the virtual drives.

At 420, the cloned SVM drives (e.g., in the datastore repositories 512 and 514 of FIG. 5) can be moved (e.g., 602 in FIG. 6) from the repository into the directories of the DVMs (e.g., 516 and 518 of FIG. 5). In this example, the image file for the source virtual drive is placed in a file in the directory of the DVM, hence becoming a VM clone (e.g., comprising drives and other components). In this embodiment, the VM clones now comprise a directory that stores the image file of the virtual drives from the SVM, along with the non-storage components, thereby completing the combining and cloning of the VMs.

At 422 the cloned SVM drives are mapped to the DVM clones (e.g., 516, 518 in FIG. 5)), from the repository to the destination DVM directory, for example, in order to associate a storage location for the drives to the directories of the DVMs. In one embodiment, a management component disposed on the controller comprising the DVM clone can perform the mapping. In another embodiment, the host (e.g., hypervisors) may perform the mapping. In yet another embodiment, the mapping may be performed manually by manipulating metadata that identifies storage locations of the SVM replacement drives in a database or file. As illustrated in the example environment 600 of FIG. 6, the virtual drives comprised in the datastores comprising the repository 512 and 514 are mapped to the DVMs 516 and 518. As an example, the mapping can comprise adding data to the DVM that identifies a location of the image file comprising the virtual drive.

At 424, the VM clones can be customized. In one embodiment, the VM clones can be powered on upon completion. That is, for example, the VM clones may be created specifically for immediate use, and can become operational immediately upon completion (e.g., used for a virtual desktop infrastructure when a new user logs in, the clone is created and powered). In one embodiment, a customized guest operating system can be applied to the VM clone. That is, for example, a plurality of VM clones can be created and respective clones can be modified for individual users or specified uses by applying guest OSs.

In another embodiment, metadata from the VM clone can be imported into a third-party tool. For example, VMs can be operated in a large enterprise using a multi-node cluster, where respective VMs are treated like physical assets. In this example, the metadata that identifies the VM and its properties can be loaded into an asset management tool. As another example, where use of VMs may be monitored (e.g., for security or data gathering) the metadata can be loaded into a third-party VM monitoring tool.

Figure 7:
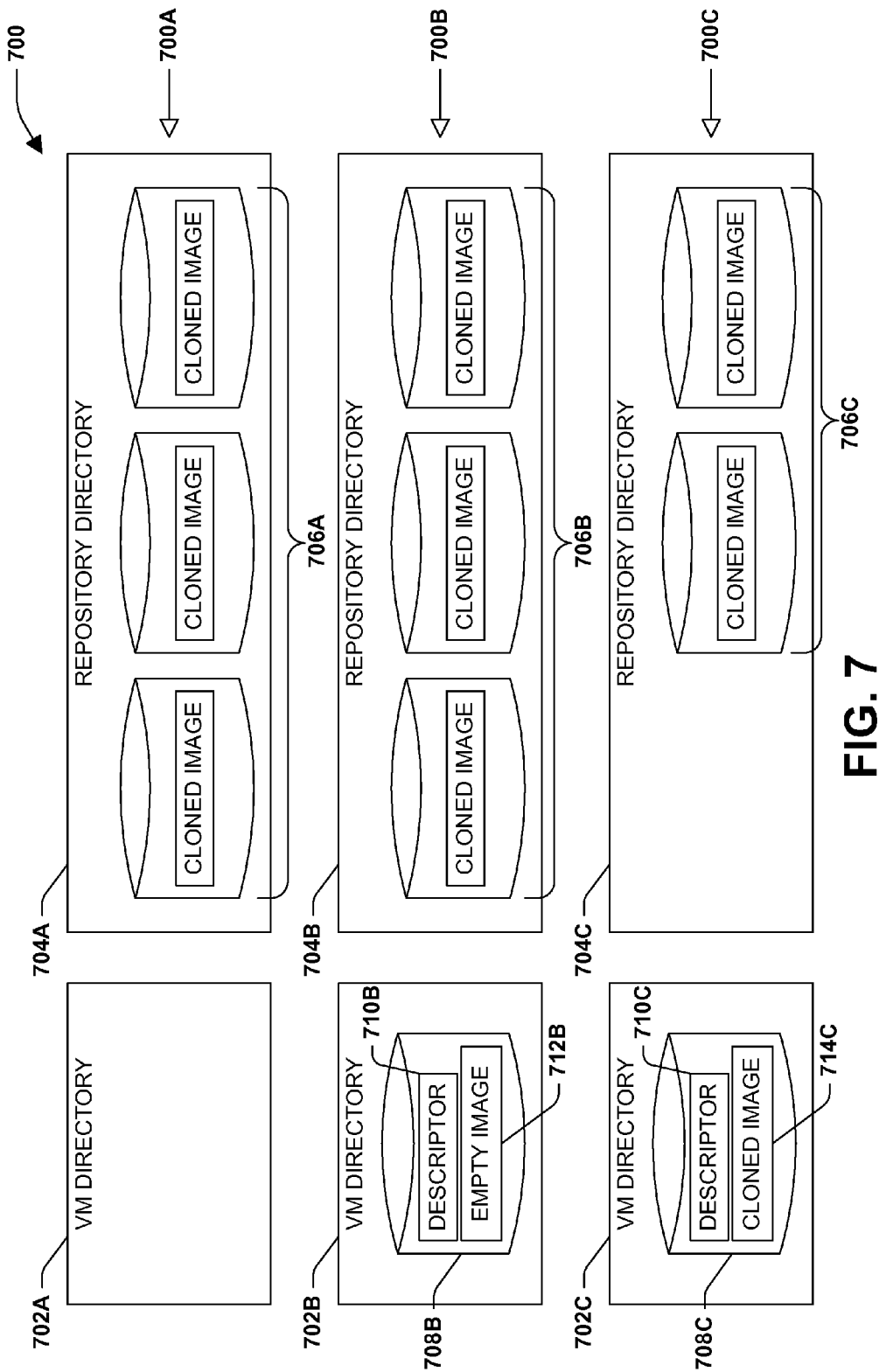

FIG. 7 is a component diagram illustrating one embodiment 700 of how a cloned image file may be moved into a directory of a VM, in accordance with one or more of the provisions set forth herein. At 700A, a VM directory 702A, such as from a DVM clone 518 of FIGS. 5 and 6, is empty as the VM merely comprises non-storage component (DVM). The Repository directory 704A, for example, located in a datastore on a storage controller, such as 512 and 514 of FIGS. 5 and 6, comprises a plurality of virtual drive image files 706A, such as 506, 508 and 510 of FIG. 5.

As an illustrative example, a virtual drive can comprise a descriptor file, containing metadata describing the properties of the virtual drive, and an image file, comprising data stored on the virtual drive. In this embodiment, merely the image file 706A is moved (e.g., when moving to the destination container) from the repository directory 704A, for example, as the descriptor file has a link to the image file that will be broken when the image file is renamed.

At 700B, a new virtual drive 708B is created in the DVM clone directory 702B using attributes of the image file from the cloned virtual drive 706B. In this embodiment, the new virtual drive 708B comprises a sparse image file 712B, for example, which is empty (e.g., contains no storage data for the virtual drive). The sparse image file 712B can have the same attributes as the image file 706B, for example, where the image file 706B comprises a 50 gB vmdk file (virtual machine disk file), the sparse image file also comprises the same attributes, however as a stub file without allocating the space. Further, the new virtual drive 708B comprises a new descriptor file 710B that has a link to the sparse image file 712B, for example, referencing the sparse image file 712B.

In this embodiment, the image file 706B is renamed to correspond to the descriptor file 710B of the new virtual drive 708B. That is, as described above, the descriptor file 710B references the sparse image file 712B; here, the image file 706B in the repository 704B is renamed to match this reference.

At 700C, the renamed image file 714C is moved into the directory of the DVM clone 702C, for example, thereby replacing the empty image file 712B. In this way, in this embodiment, the VM directory 702C now comprises the new virtual drive 708C that has a cloned image of the source virtual drive, for example, thereby effectively combining the DVM with the source virtual drive.

Figure 8:
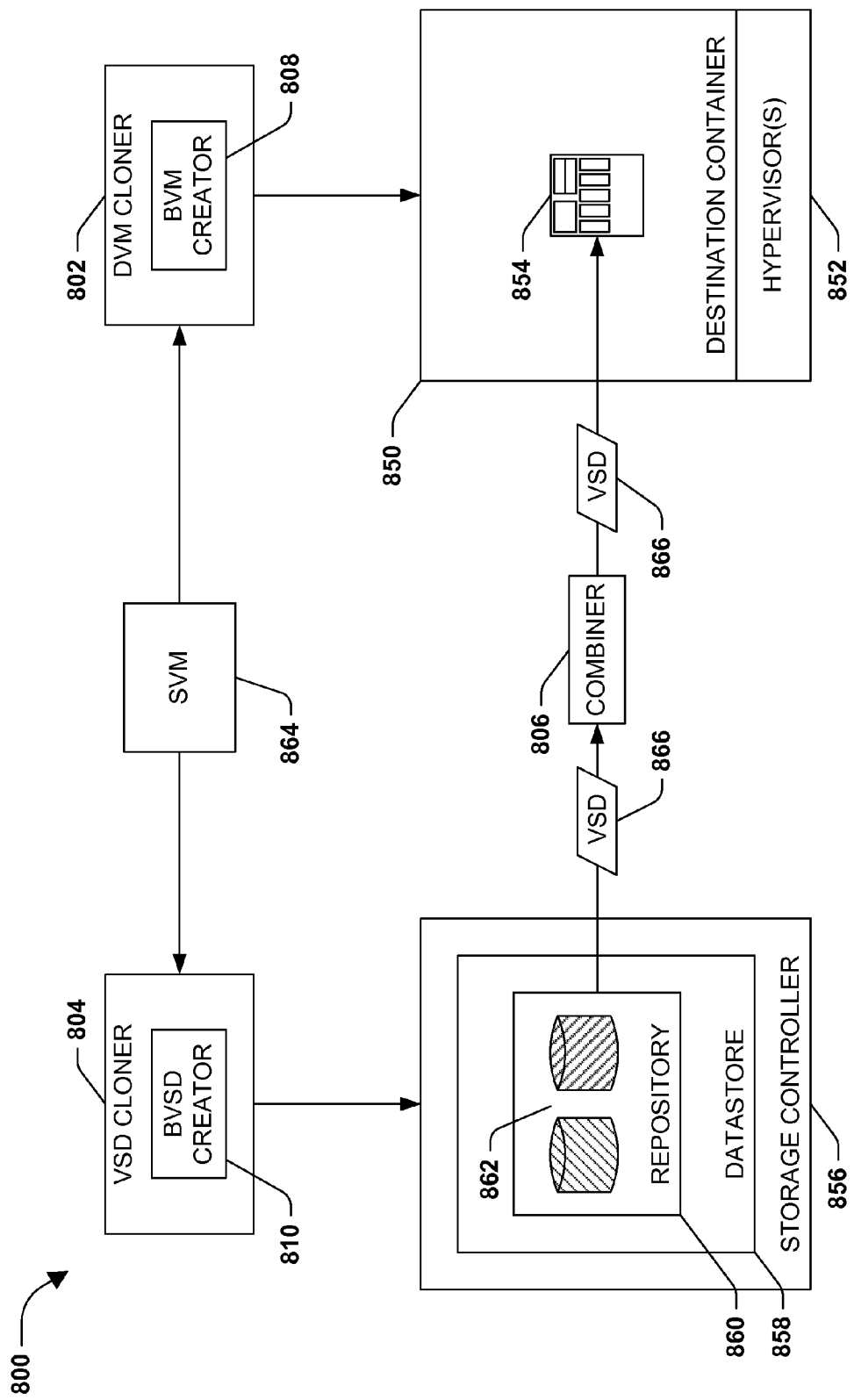
FIG. 8 is component diagram illustrating an example system configured to clone a virtual machine in accordance with one or more of the provisions set forth herein.

A system may be devised that provides for fast and efficient (e.g., resource efficient) cloning of virtual machines. FIG. 8 is a component diagram of an example system 800 for cloning virtual machines, such as on a controller or distributed data storage and management system (cluster).

In the example system 800, a diskless virtual machine (DVM) cloning component 802 is operably coupled with a destination container 850 that is associated with one or more host hypervisors 852. In one embodiment, with reference to FIGS. 1 and 2, the DVM cloning component 802 may be disposed on node (e.g., 116, 118) in a cluster (e.g., 100), such as on a network-module (e.g., 120, 122) or a data-module (e.g., 124, 126). Further, the destination container may be operable using a processor (e.g., 204) in the node, with the hypervisor operational programming stored in memory (e.g., 206) of the node. Additionally, the hypervisor may utilize elements stored in an attached volume, such as 230, 232.

The DVM cloning component 802 comprises a baseline virtual machine (BVM) creation component 808 that creates a BVM clone 854 in the destination container 850 from a source virtual machine 864 (SVM), where the BVM clone 854, when created, comprises no virtual storage disk components from the SVM 864. That is, for example, the BVM creation component 808 creates a diskless version of the SVM in the destination container, which can be used as a baseline for cloning additional DVMs if desired.

The example system 800 comprises a virtual storage drive (VSD) cloning component 804 that is operably coupled with a storage controller 856 that comprises a datastore 858 in which a repository directory is created 860. For example, a temporary repository directory 862 can be created in the datastore 858 on the storage controller 856, for storing VSD clones. In one embodiment, the VSD cloning component 804 can be disposed on a first node in a cluster, as described above, and the datastore may be disposed on a second node in the cluster that is a storage controller. In another embodiment, the storage controller may comprise the datastore and the VSD cloning component 804.

The VSD cloning component 804 comprises a baseline virtual storage disk (BVSD) creation component 810 that creates a baseline clone 862 of one or more virtual storage drive (VSD) components of the SVM 864 in the repository directory 860. For example, the BVSD creation component 810 can clone or copy (e.g., depending on a location of the repository with respect to the SVM) the virtual storage elements of the SVM 864 (e.g., virtual drives, disk, storage adapters) to the repository directory 860 in the datastore 858 of the storage controller 856. The BVSD creation component 810 may utilize a native copy or cloning mechanism, for example, or a data-container level cloning operation (e.g., file-level or block level cloning operation), depending on a compatibility between the source and target locations of the clone/copy. In one embodiment, the SVM 864 may be stored in a different controller (e.g., 102 of FIG. 1) than the storage controller (e.g., 104 of FIG. 1). If the different controllers are compatible, for example, one type of clone/copy may be used, but if they are not compatible, another type of cone/copy may be used.

The example system 800 further comprises a combining component 806 that is operably coupled with the destination container 850 and the datastore 858. The combining component 806 combines the BVM clone 854 (e.g., DVM) with the VSD component clone 862 by mapping the VSD component clone 866 to the BVM clone 854 in the destination container 850. In one embodiment, the mapped VSDs 866 can then be moved into a directory for the BVM clone 854, for example, thereby combining the cloned virtual drives from the SVM 864 with the cloned DVM 854 to create a clone of the SVM 864.

Figure 9:
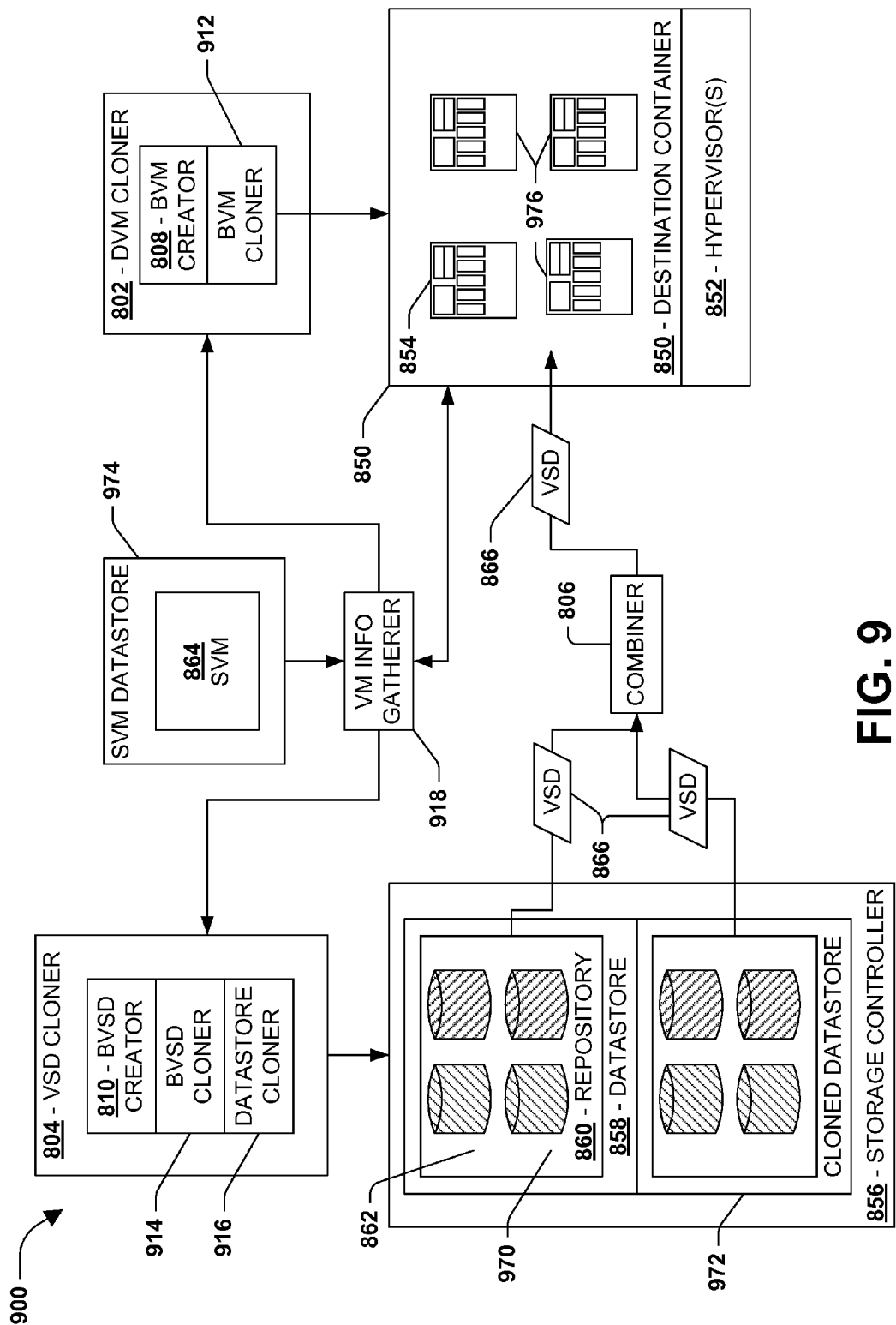
FIG. 9 is component diagram illustrating one embodiment of one or more systems configured to clone a virtual machine in accordance with one or more of the provisions set forth herein.

FIG. 9 is a component diagram illustrating an example implementation 900 of one or more systems configured to clone a virtual machine, in accordance with one or more of the provisions set forth herein. In the example embodiment 900, the DVM cloning component 802 comprises a BVM cloning component 912 that creates one or more clones 976 of the BVM clone 854. That is, the BVM cloning component 912 can create additional DVM clones from the BVM, so that a total number of DVMs meets a desired number of clones for the VM cloning, for example.

The VSD cloning component 804 comprises a BVSD cloning component 914 that can create one or more clones 970 of the baseline clone 862 of the VSD component (e.g., or set of VSD components). That is, the BVSD cloning component 914 clones the baseline drive in the repository 860, for example, so there is a number of sets of virtual drive clones for the SVM 864 sufficient to match a total number of VM clones desired for the cloning operation.

The VSD cloning component 804 can also comprise a datastore cloning component 916 that can clone the datastore with the repository 860, one or more times, to create clones of the datastore 972 comprising clones of the VSDs. That is, instead of cloning individual sets of VSD (e.g., 862, 970), for example, the VSD cloning component 804 can clone the entire datastore comprising the repository, thereby effectively doubling (or more) a number of sets of VSD clones.

In this embodiment 900, a VM information gathering component 918 is operably coupled with one or more destination containers 850 and a datastore 974 that comprises the SVM 864. The VM information gathering component 918 can interrogate the SVM 864 to determine information for creating a clone of components of the SVM. That is, the SVM can comprise configurations for a processor, memory, storage, and other VM components that enable a hypervisor (e.g., 852) to emulate the VM. These components and configurations can be determined by the VM information gathering component 918.

Further, the VM information gathering component 918 can identify a host associated with a destination container 850. As described above, the host can comprise a hypervisor, a group of hypervisors as a host cluster, or the respective hypervisors that are found in a management hierarchy as a data center. The host is identified, for example, so that the VM information gathering component 918 can verify whether the host is able to communicate with the datastore (e.g., 858, 972) that comprises the virtual storage disk component clone (e.g., 862, 970). Further, for example, the host information gathered by the VM information gathering component 918 may be presented to a user/administrator or program so that one or more desired hosts or host configurations can be chosen, such as for a desired application/use of the VM clones.

Figure 10:
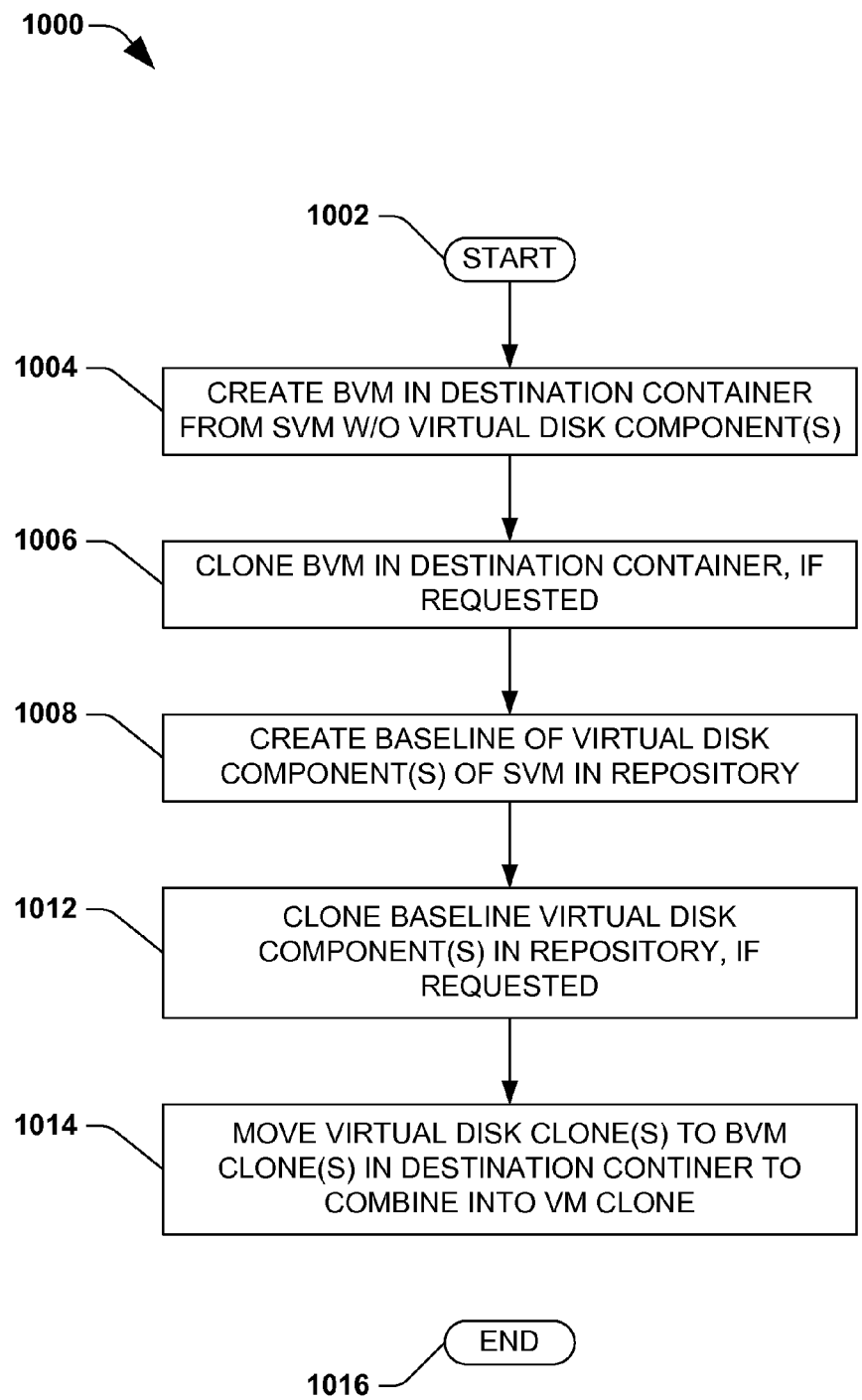
FIG. 10 is a flow chart diagram illustrating an example alternate method for cloning virtual machines in accordance with one or more of the provisions set forth herein.

An alternate method may be devised for quickly and efficiently creating clones of virtual machine, such as on a controller or cluster of controllers. FIG. 10 is a flow diagram of an example alternate method 1000 for cloning VMs. The example alternate method 1000 begins at 1102 and, in order to separate cloning of the virtual storage disk components from cloning of the VM, it involves creating a baseline virtual machine (BVM), at 1104. Here the BVM is created in a destination container from a source virtual machine (SVM), where the BVM, as created, does not include virtual storage disk components from the SVM (e.g., virtual drives, disks, and adapters). That is, the BVM merely comprises non-storage related components, such as memory, processing configurations, input/output adapters, etc. Further, the destination container can be a hypervisor environment that provides for VM emulation, as described above.

At 1006, the BVM is cloned one or more times in the destination container, if more than one clone is requested. That is, the BVM (a baseline diskless virtual machine (DVM)) is cloned into a plurality of DVMs if more than one clone of the SVM is being created. For example, if two VM clones are being created, the BVM will be cloned once, resulting in the BVM and a DVM clone (tow clones).

At 1008, a baseline of one or more virtual storage drive (VSD) components of the SVM are created in a repository directory that has been created in a datastore on a storage controller. That is, for example, the baseline VSD is cloned or copied (depending on an arrangement of controllers and/or volumes comprising the repository and the SVM) to the repository, where the baseline VSD is an image file of one of the SVMs virtual drives. In this embodiment, the repository is located on a storage controller, for example, so that the cloning of the virtual drive components can be performed separately from the cloning of the other SVM components (as described above.

At 1012, the baseline of the VSD component one or more times in the repository directory, if more than one clone is requested. That is, for example, the baseline VSD is cloned a number of times (e.g., by file-level cloning mechanisms) in the repository so that a total number of sets of VSDs in the repository is equivalent to a total number of VM clones desired. In one embodiment, the SVM may comprise a plurality of VSDs, for example, and each VSD for the SVM is cloned to create a set of VSDs for the SVM. In this embodiment, a number of sets of VSDs in the repository matches a total number of VMs to be cloned.

At 1014, the BVM clone (e.g., DVM) is combined with the VSD component clone by mapping the VSD component clone to the BVM clone in the destination container. That is, the image files that comprise the virtual drives of the SVM can be moved to directories of the DVMs. In order to combine the separate virtual storage components that were cloned in the storage controller with the DVMs that were cloned in the destination container, the virtual drives are moved to the DVM directories then mapped to the DVMs, for example, in order to associate the cloned drives with the DVMs. In this way, in this example, the two sets of components are effectively combined for the VM clones.

Having mapped the VSD clones to the BVM clones the example method 1000 ends at 1016.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
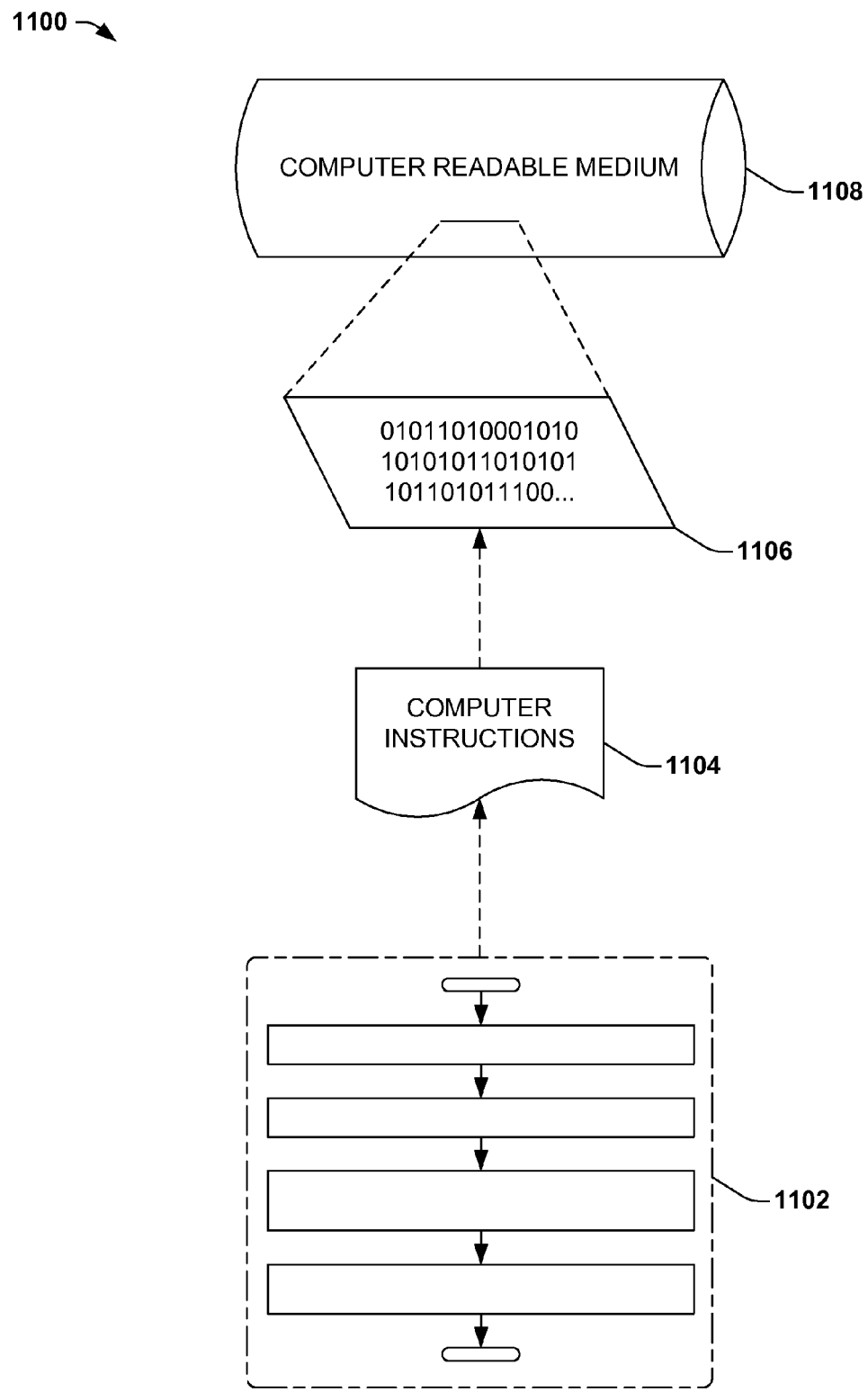
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, or a platter of a hard disk drive), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as the method 300 of FIG. 3 or method 1000 of FIG. 10, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method for separately cloning a virtual drive of a source virtual machine and configuration data of the source virtual machine for combination into a cloned virtual machine, comprising:

populating a datastore of a storage controller with a copy of a source virtual drive image file, of a source virtual machine that is to be cloned, to create a copied source virtual drive image file;

generating a diskless virtual machine in a destination container based upon configuration data of the source virtual machine;
invoking the storage controller to clone the copied source virtual drive image file to create a cloned source virtual drive image file in the datastore;
invoking a second storage controller to clone the diskless virtual machine to create a cloned diskless virtual machine in the destination container, the second storage controller cloning the diskless virtual machine concurrently with the storage controller cloning the copied source virtual drive image file; and
combining the cloned source virtual drive image file, from the datastore, with the cloned diskless virtual machine in the destination container to create a cloned virtual machine, the combining comprising mapping the cloned source virtual drive image file to the cloned diskless virtual machine.

2. The method of claim 1, the source virtual machine comprising at least one of:
a virtual machine;
a virtual machine template; or
a snapshot of a virtual machine.

3. The method of claim 1, the configuration data comprising data related to at least one of:
processor configuration;
memory configuration;
user specified options;
unique identifier;
type of source virtual machine; or
an indicator of a datastore comprising the source virtual machine.

4. The method of claim 1, the invoking the storage controller to clone the copied source virtual drive image file comprising:
offloading the cloning of the copied source virtual drive image file from the second storage controller to the storage controller; and
instructing the second storage controller to facilitate storage operations to a second datastore accessible through the second storage controller during cloning of the copied source virtual drive image file by the storage controller:
invoking the storage controller to clone the copied source virtual drive image file.

5. The method of claim 1, the cloning of the copied source virtual drive image file tuned in a first manner and the cloning of the diskless virtual machine tuned in a second manner such that the cloned source virtual drive image file and the cloned diskless virtual machine are created within a threshold completion time with respect to one another.

6. The method of claim 1, comprising:
identifying the storage controller based upon resource availability of the storage controller.

7. The method of claim 1, comprising:
invoking a hypervisor to configure the cloned source virtual drive image file as a new virtual hard drive for the cloned virtual machine.

8. The method of claim 1, the copied source virtual drive image file comprising at least one of:
a data storage adapter or a virtual hard drive.

9. The method of claim 1, comprising:
configuring the cloned virtual machine to utilize the cloned source virtual drive image file as a new virtual drive.

10. The method of claim 1, the mapping comprising:
presenting the cloned source virtual drive image file to a hypervisor for the destination container; and
invoking the hypervisor to map the cloned source virtual drive image file to the cloned diskless virtual machine.

11. The method of claim 1, the combining comprising:
moving the cloned source virtual drive image file from the datastore to the destination container.

12. The method of claim 1, the combining comprising:
retrieving an attribute of the cloned source virtual drive image file;
creating a new virtual drive in the cloned virtual machine using the attribute, the new virtual drive comprising a sparse file;
renaming the cloned source virtual drive image file to a descriptor file of the new virtual drive; and
moving the renamed cloned source virtual drive image file to a directory of the cloned virtual machine.

13. The method of claim 1, comprising:
customizing the cloned virtual machine.

14. The method of claim 13, the customizing the cloned virtual machine comprising:
powering on the cloned virtual machine;
applying a customized guest operating system to the cloned virtual machine; and
importing metadata from the cloned virtual machine to a third-party tool.

15. A system for separately cloning a virtual drive of a source virtual machine and configuration data of the source virtual machine for combination into a cloned virtual machine, comprising:
one or more processors; and
memory comprising instructions that when executed by at least some of the one or more processors implement at least some of the following:
a virtual storage drive cloning component, on a storage controller, configured to:
populate a datastore of the storage controller with a copy of a source virtual drive image file, of a source virtual machine that is to be cloned, to create a copied source virtual drive image file; and
clone the copied source virtual drive image file to create a cloned source virtual drive image file in the datastore;
a diskless virtual machine cloning component, on a second storage controller, configured to:
generate a diskless virtual machine in a destination container based upon configuration data of the source virtual machine; and
clone the diskless virtual machine to create a cloned diskless virtual machine in the destination container, the diskless virtual machine cloning component configured to clone the diskless virtual machine concurrently with the virtual storage drive cloning component cloning the copied source virtual drive image file; and
a combining component configured to:
combine the cloned source virtual drive image file, from the datastore, with the cloned diskless virtual machine in the destination container to create a cloned virtual machine, the combining comprising mapping the cloned source virtual drive image file to the cloned diskless virtual machine.

16. The system of claim 15, the combining component configured to:
present the cloned source virtual drive image file to a hypervisor for the destination container; and
invoke the hypervisor to map the cloned source virtual drive image file to the cloned diskless virtual machine.

17. The system of claim 15, the second storage controller configured to facilitate storage operations to a second datastore accessible through the second storage controller during the cloning of the copied source virtual drive image file by the virtual storage drive cloning component.

18. The system of claim 15, the combining component configured to:
- power on the cloned virtual machine;
- apply a customized guest operating system to the cloned virtual machine; and
- import metadata from the cloned virtual machine to a third-party tool.

19. The system of claim 15, the combining component configured to:
- retrieve an attribute of the cloned source virtual drive image file;
- create a new virtual drive in the cloned virtual machine using the attribute, the new virtual drive comprising a sparse file;
- rename the cloned source virtual drive image file to a descriptor file of the new virtual drive; and
- move the renamed cloned source virtual drive image file to a directory of the cloned virtual machine.

20. A non-transitory computer-readable medium comprising processor-executable instructions that when executed perform a method for creating a cloned virtual machine, comprising:

- populating a datastore of a storage controller with a copy of a source virtual drive image file, of a source virtual machine that is to be cloned, to create a copied source virtual drive image file;
- generating a diskless virtual machine in a destination container based upon configuration data of the source virtual machine;
- invoking the storage controller to clone the copied source virtual drive image file to create a cloned source virtual drive image file in the datastore;
- invoking a second storage controller to clone the diskless virtual machine to create a cloned diskless virtual machine in the destination container, the second storage controller cloning the diskless virtual machine concurrently with the storage controller cloning the copied source virtual drive image file; and
- combining the cloned source virtual drive image file, from the datastore, with the cloned diskless virtual machine in the destination container to create a cloned virtual machine, the combining comprising mapping the cloned source virtual drive image file to the cloned diskless virtual machine.

* * * * *